(12) United States Patent
Ruffa

(10) Patent No.: US 6,659,640 B2
(45) Date of Patent: Dec. 9, 2003

(54) FIBER OPTIC TEMPERATURE MEASUREMENT SYSTEM AND METHOD

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/844,743

(22) Filed: Apr. 26, 2001

(65) Prior Publication Data

US 2002/0159499 A1 Oct. 31, 2002

(51) Int. Cl.[7] .......................... G01K 11/00; G02B 6/34
(52) U.S. Cl. ..................... 374/161; 374/120; 385/37
(58) Field of Search .......................... 374/120, 161; 385/37, 12

(56) References Cited

U.S. PATENT DOCUMENTS

| | | | | |
|---|---|---|---|---|
| 4,842,403 A | * | 6/1989 | Tarbox et al. | 356/73 |
| 4,852,027 A | * | 7/1989 | Bowman et al. | 702/136 |
| 4,996,419 A | * | 2/1991 | Morey | 250/227.18 |
| 5,399,854 A | * | 3/1995 | Dunphy et al. | 250/227.14 |
| 5,684,297 A | * | 11/1997 | Tardy | 250/227.14 |
| 5,909,273 A | * | 6/1999 | Malvern | 356/35.5 |
| 6,024,488 A | * | 2/2000 | Wu et al. | 374/161 |
| 6,056,436 A | * | 5/2000 | Sirkis et al. | 374/161 |
| 6,125,216 A | * | 9/2000 | Haran et al. | 250/227.14 |
| 2001/0022804 A1 | * | 9/2001 | Helmig et al. | 374/161 |
| 2001/0055445 A1 | * | 12/2001 | Gaylord et al. | 385/37 |

FOREIGN PATENT DOCUMENTS

| | | | | |
|---|---|---|---|---|
| WO | WO00/39548 | * | 7/2000 | G01K/11/32 |
| WO | WO01/53880 A1 | * | 7/2001 | G02F/1/01 |

* cited by examiner

Primary Examiner—Diego Gutierrez
Assistant Examiner—Lydia M. De Jesús
(74) Attorney, Agent, or Firm—James M. Kasischke; Michael F. Oglo; Jean-Paul A. Nasser

(57) ABSTRACT

A system and method is provided for determining the temperature to which a structure is subjected. An optical fiber having at least one pair of fiber sensors is attached to the structure. The fiber sensors comprise Bragg gratings and each is configured to have a particular coefficient of thermal expansion and be responsive to a particular wavelength. A broadband spectrum of light is launched into the optical fiber. The light returning from the fiber sensors is detected. The temperature to which the structure is subjected is then determined based on the difference in strain response of the fiber sensors as a result of the effects of temperature upon the fiber sensors. Coatings of different materials may be applied over the optical fiber to provide the fiber sensors with differing coefficients of thermal expansion.

6 Claims, 1 Drawing Sheet

FIBER OPTIC TEMPERATURE MEASUREMENT SYSTEM AND METHOD

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

Not applicable.

BACKGROUND OF THE INVENTION

1. Field of the Invention

The present invention generally relates to a system and method for determining the temperature to which a structure is subjected.

2. Description of the Prior Art

The temperature of a fluid surrounding an elongated probe provides important diagnostic information for structures within the fluid, e.g., in the medical field. There have been several conventional techniques for measuring such temperature, such as embedding thermister-type sensors in the probe wherein each thermister-type sensor is supported by a pair of wires. Another conventional technique utilizes fiber optic sensors based upon Bragg gratings. Bragg gratings are described in U.S. Pat. Nos. 5,493,390, 5,563,967, and 5,892,860. Bragg grating-type sensors have advantages over thermister-type sensors because fiber-optic sensors can exist on one fiber. Fiber optic sensors based on Bragg gratings sense temperature based on strain on the sensor. However, such strain also can be induced by non-temperature effects such as hydrostatic pressure, tension, bending, etc. which can cause erroneous temperature measurements. Another optional method to measure temperature makes use of Raman scattering effects. Here, light is scattered from the inhomogeneities in the glass and the scattered light is processed to determine temperature. However, it is difficult to obtain a point of measurement by this method as the spatial resolution is about ½ meter.

Therefore, it is an object of the present invention to provide a novel system and method for measuring the temperature of a fluid surrounding a probe wherein such system and method do not exhibit or present the problems and disadvantages of conventional techniques.

Other objects and advantages of the present invention will be apparent to one of ordinary skill in the art in light of the ensuing description of the present invention.

SUMMARY OF THE INVENTION

In one aspect, the present invention is directed to a system for determining the temperature to which a structure is subjected, comprising an optical fiber configured for attachment to a structure, a pair of fiber sensors formed within the optical fiber, each fiber sensor being configured to have a particular coefficient of thermal expansion and particular identification, a light source for launching a broadband source of light into the optical fiber, a detector for detecting the light returning from the first and second fiber sensors, and a processor for determining the temperature to which the structure is subjected based upon the difference in the strain response of each fiber sensor due to the effects of temperature upon the fiber sensors.

In a related aspect, the present invention is directed to a method of determining the temperature to which a structure is subjected, comprising the steps of providing an optical fiber having at least one pair of fiber sensors formed therein wherein the fiber sensors are substantially collocated and each fiber sensor is configured to have a particular coefficient of thermal expansion and a particular identification, attaching the optical fiber to the structure, launching a broadband spectrum of light into the optical fiber, detecting light returning from the fiber sensors, and determining the temperature to which the structure is subjected based on the difference in strain response of the fiber sensors as a result of the effects of temperature upon the fiber sensors.

In one embodiment, each fiber sensor is configured as a Bragg grating.

In one embodiment, the identification of each fiber sensor comprises a particular fiber sensor wavelength.

In one embodiment, one of the fiber sensors comprises a coating of material that is configured to provide that fiber sensor with a first coefficient of thermal expansion and the other fiber sensor comprises a coating of material that is configured to provide that fiber sensor with a second coefficient of thermal expansion that is different than the first coefficient of thermal expansion.

BRIEF DESCRIPTION OF THE DRAWINGS

The features of the invention are believed to be novel and the elements characteristic of the invention are set forth with particularity in the appended claims. The figure is for illustration purposes only and is not drawn to scale. The invention itself, however, both as to organization and method of operation, may best be understood by reference to the detailed description which follows taken in conjunction with the accompanying drawing in which:

The figure is a block diagram of the apparatus of the present invention.

DESCRIPTION OF THE PREFERRED EMBODIMENT

Figure 1:
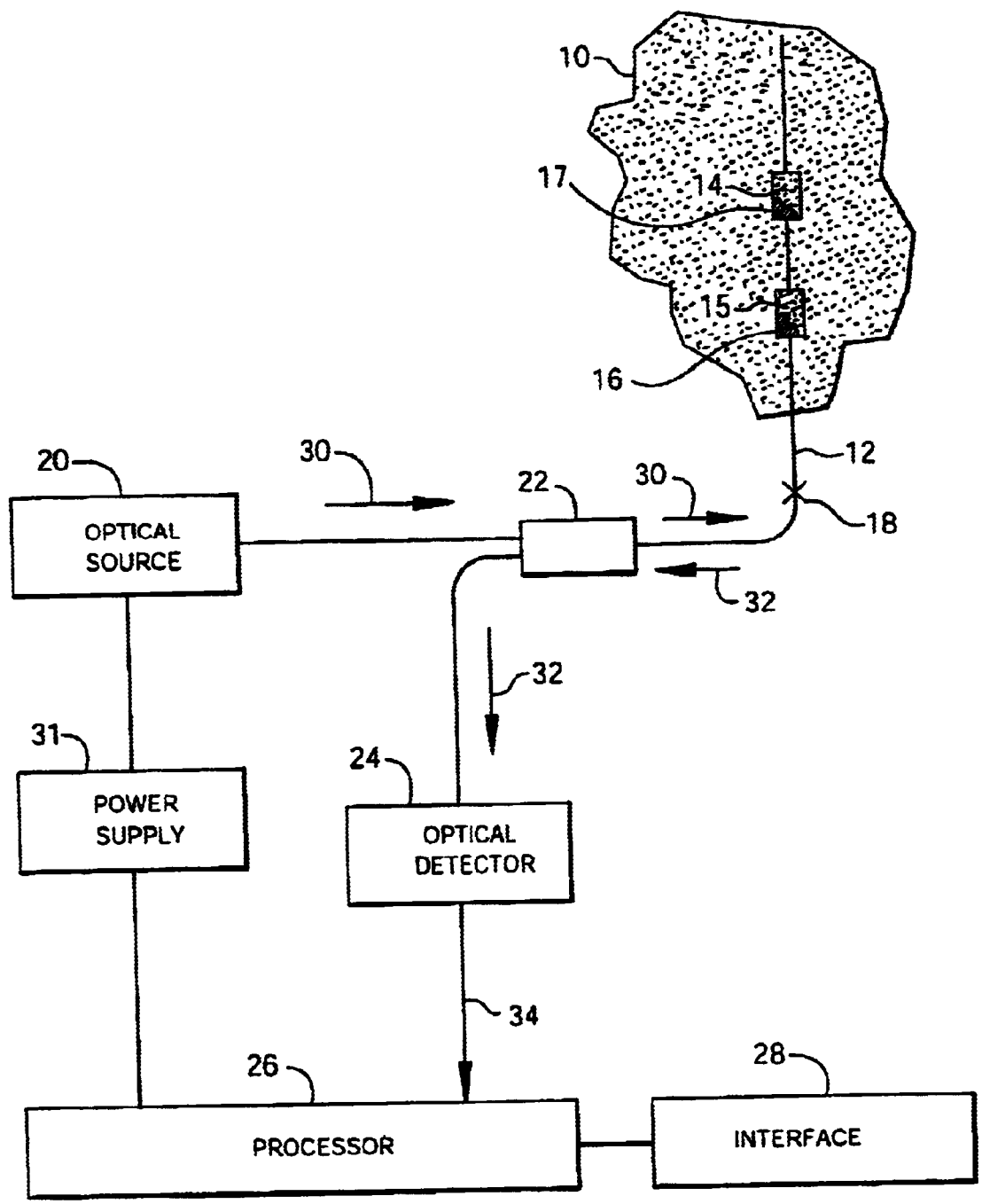

In describing the preferred embodiments of the present invention, reference will be made herein to the figure in which like numerals refer to like features of the invention.

The present invention provides a new and improved system and method for accurately determining the temperature in a fluid surrounding an elongated probe. However, it is to be understood that the present invention can be used to determine the temperature to which other structures are subjected, whether or not such structures are in a fluid environment. Thus, many applications are possible.

Referring to the figure, there is shown a portion of structure 10. In one embodiment, optical fiber 12 is attached or mounted to structure 10. In another embodiment, optical fiber 12 is a stand-alone probe. Bragg grating sensors 14 and 15 are integrated into optical fiber 12. In one embodiment, Bragg grating sensors 14 and 15 are embedded with optical fiber 12 in structure 10. In another embodiment, Bragg grating sensors 14 and 15 are bonded with optical fiber 12 to structure 10. Optical fiber 12 has primary entry and exit point 18. In a preferred embodiment, fiber sensors 14 and 15 are substantially collocated so that all factors causing strain due to non-temperature effects such as hydrostatic pressure, tension, bending, etc. have the same effect on each Bragg grating sensor 14 and 15. Preferably, fiber sensors 14 and 15 are in a low-tension environment, such as would be expected in a medical probe.

The system of the present invention further includes optical source 20, optical fiber coupler 22, optical detector 24, processor 26 and interface 28. Optical source 20 is connected to primary entry and exit point 18 of optical fiber 12 and emits optical radiation in the direction indicated by arrow 30. Power supply 31 supplies power for optical source 20. Optical fiber coupler 22 couples reflected optical radiation, indicated by arrow 32, to optical detector 24. Optical detector 24 outputs electrical signal 34 that represents detected optical radiation. Signal 34 is inputted into processor 26. Processor 26 can be realized by a commercially available microprocessor such as the type produced by Intel Inc., Motorola, Sun Microsystems, etc. Processor 26 effects determination of strain upon each Bragg grating sensor 14 and 15 and, as a result of such strain determination, determines the temperature to which that portion of structure 10 is subjected. This is further explained in the ensuing description. Processor 26 is in data communication with interface 28. Interface 28 is in data communication with user input devices such as a computer, laptop notebook, meters, digital signal analyzers, oscilloscopes, etc. (not shown). Interface 28 is also in data communication with data display devices such as computer screens, liquid-crystal displays, etc. (not shown). Interface 28 allows a user to input into processor 26 specific calibration data pertaining to optical fiber 12 and Bragg grating sensors 14 and 15. This calibration data is explained in detail in the ensuing description.

In accordance with the present invention, each Bragg grating sensor 14 and 15 is configured so that each sensor 14 and 15 reacts differently to temperature. This is accomplished by configuring each Bragg grating sensor 14 and 15 to have a different coefficient of thermal expansion. Optical fibers can typically be fabricated having on the order of 2.5 micro-strain/F.° (micro-strain per degree Fahrenheit). Thus, in one embodiment, fiber sensor 14 is left in its raw configuration resulting from the manufacturing process of this sensor, while fiber sensor 15 is coated with a material 16 that provides fiber sensor 15 with a coefficient of thermal expansion that is significantly different than the coefficient of thermal expansion of fiber sensor 14. In a preferred embodiment, the difference in the coefficients of thermal expansion of fiber sensors 14 and 15 is at least 5.0 micro-strain/F.°. More preferably, the difference in the coefficients of thermal expansion of sensors 14 and 15 is at least 10.0 micro-strain/F.°. Most preferably, the difference in the coefficients of thermal expansion of sensors 14 and 15 is greater than 10.0 micro-strain/F.°.

In one example, fiber sensor 15 is coated with Aluminum or Magnesium. Each of these materials has a coefficient of thermal expansion of about 14.0 micro-strain/F.°. If fiber sensor 14 is not coated with any material, the difference in the coefficients of thermal expansion of fiber sensors 14 and 15 is 11.5 micro-strain/F.°.

In an alternate embodiment, sensor 14 is coated with a different material 17 that provides sensor 14 with a coefficient of thermal expansion that is significantly different than the coefficient of thermal expansion of sensor 15. Thus, for example, sensor 14 is coated with Tungsten or Molybdenum, each of which having a coefficient of thermal expansion between about 2.5–3.0 micro-strain/F.°, while sensor 15 is coated with Aluminum or Magnesium as described in the foregoing discussion. In such a configuration, the difference in the coefficients of thermal expansion of fiber sensors 14 and 15 is between about 11.0 and 11.5 micro-strain/F.°.

In another example, sensor 14 is coated with Tungsten or Molybdenum, as described in the foregoing description, and sensor 15 is coated with Lead, which has a coefficient of thermal expansion of about 29.0 micro-strain/F.°. Such a relative high coefficient of thermal expansion provides a significant difference in temperature sensitivity between sensors 14 and 15. In this configuration, the difference in the coefficients of thermal expansion of fiber sensors 14 and 15 is between about 26.0 and 26.5 micro-strain/F.°.

It is to be understood that these are just examples and that other material coatings can be used as well. As a result of the different coefficient of thermal expansion values of the material coatings, each of the Bragg grating sensors 14 and 15 exhibit a unique and different degree of strain due to temperature while reacting in substantially the same manner in response to non-temperature effects such as hydrostatic pressure, tension, bending, etc.

Interface 28 is used to input calibration data into processor 26. Such calibration data includes the diameter of optical fiber 12, the thickness of the material coatings of fiber sensors 14 and 15, coefficients of thermal expansion, and other variations in the properties of these material coatings. Processor 26 uses the calibration data to determine the temperature of the portion of structure 10 at which fiber sensors 14 and 15 are located. Since the strain upon each fiber sensor 14 and 15 due to non-temperature effects is substantially the same, the difference between the non-temperature strain of fiber sensor 14 and fiber sensor 15 is negligible. In a preferred embodiment, processor 26 is programmed with an algorithm that uses the aforementioned calibration data and which determines the strain upon each fiber sensor 14 and 15 due to both temperature and non-temperature effects.

In a preferred embodiment, fiber sensors 14 and 15 are collocated upon optical fiber 12 and are configured to have different wavelengths to facilitate identification of each fiber sensor 14 and 15. However, in another embodiment, the fiber sensors 14 and 15 are configured to have the same wavelengths. In such a configuration, fiber sensors 14 and 15 are sufficiently spaced so as to enable time multiplexing by processor 26. Such a configuration effects averaging of the temperature measurement over a length scale on the order of the fiber sensor spacing. In such a configuration, the length scale is minimized by wrapping optical fiber 12 around structure 10 in a helical formation. The helical formation also limits any bending stress to which structure 10 may be subjected.

Thus, the system and method of the present invention achieves the objects set forth above and provides many advantages. Specifically, the system of the present invention:
  a) utilizes sensors that are passive and do not require operating voltage source;
  b) provides accurate and consistent measurements;
  c) can be implemented with a variety of hardware and software systems and components; and
  d) can be implemented at a relatively low cost.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A system for measuring the temperature to which a structure is subjected, comprising:
   an optical fiber configured to be positioned within an environment in which the structure is located;

a coupler in optical communication with the optical fiber;

first and second Bragg grating sensors formed within the optical fiber, each Bragg grating sensor being configured to have a particular sensor wavelength;

a first material deposited over the first Bragg grating sensor, the first material having a first coefficient of thermal expansion, the first Bragg grating sensor having a coefficient of thermal expansion that is based predominately on the first coefficient of thermal expansion of the first material;

a second material deposited over the second Bragg grating sensor, the second material having a second coefficient of thermal expansion that is significantly greater than the first coefficient of thermal expansion, the second Bragg grating sensor having a coefficient of thermal expansion that is based predominately on the second coefficient of thermal expansion of the second material;

wherein the difference between the coefficient of thermal expansion of the first Bragg grating sensor and the coefficient of thermal expansion of the second Bragg grating sensor is greater than 10.0 micro-strain per degree Fahrenheit thereby providing a significant difference in temperature sensitivity between the first and second Bragg grating sensors;

a light source in optical communication with the coupler for launching a broadband source of light into the optical fiber;

a detector in optical communication with the coupler for detecting the light returning from the first and second Bragg grating sensors;

a processor joined to said detector for measuring the strain response of each Bragg grating sensor due to the effects of temperature upon the Bragg grating sensors, determining the difference between the measured strain responses of each Bragg grating sensor, and determining the temperature to which the structure is subjected based on the measured difference between the measured strain responses; and an interface in data communication with said processor for inputting into said processor calibration data defining the coefficient of thermal expansion and identification of each Bragg grating sensor.

2. The system according to claim 1 wherein the first material is chosen from the group consisting of tungsten and molybdenum.

3. The system according to claim 1 wherein the second material is chosen from the group consisting of aluminum, magnesium and lead.

4. A method of measuring the temperature to which a structure is subjected, comprising:

providing a system comprising an optical fiber having first and second Bragg grating sensors formed therein, each of the Bragg grating sensors being configured to have a particular sensor wavelength, the system further comprising a first material deposited over the first Bragg grating sensor, the first material having a first coefficient of thermal expansion, the first Bragg grating sensor having a coefficient of thermal expansion that is based predominately on the first coefficient of thermal expansion of the first material, the system further comprising a second material deposited over the second Bragg grating sensor, the second material having a second coefficient of thermal expansion that is significantly greater than the first coefficient of thermal expansion, the second Bragg grating sensor having a coefficient of thermal expansion that is based predominately on the second coefficient of thermal expansion of the second material, wherein the difference between the coefficient of thermal expansion of the first Bragg grating sensor and the coefficient of thermal expansion of the second Bragg grating sensor is greater than 10.0 micro-strain per degree Fahrenheit, the system further comprising a processor for measuring the strain response of each Bragg grating sensor due to the effects of temperature upon the Bragg grating sensors, determining the difference between the measured strain responses of each Bragg grating sensor, and determining the temperature to which the structure is subjected based on the measured difference between the measured strain responses;

calibrating the processor with data defining the coefficient of thermal expansion and the wavelength of each Bragg grating sensor;

attaching the optical fiber to the structure;

launching a broadband spectrum of light into the optical fiber;

detecting light returning from the Bragg grating sensors;

measuring the strain response of each Bragg grating sensor due to the effects of temperature upon the Bragg grating sensors;

determining the difference between the measured strain responses of each Bragg grating sensor; and determining the temperature to which the structure is subjected based on the coefficient of thermal expansion and wavelength of each Bragg grating sensor and the measured difference between the measured strain responses.

5. The system according to claim 4 wherein the first material is chosen from the group consisting of tungsten and molybdenum.

6. The system according to claim 4 wherein the second material is chosen from the group consisting of aluminum, magnesium and lead.

* * * * *